No. 12,101. REISSUED MAR. 17, 1903.
W. FREY.
BRICK EDGE SMOOTHING BLADE.
APPLICATION FILED OCT. 23, 1902.
Fig. 1
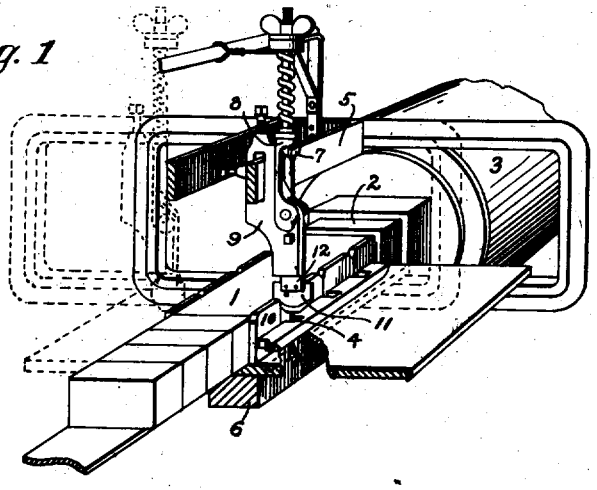
Fig. 2.
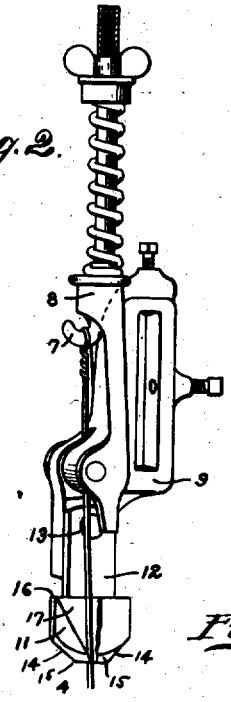
Fig. 3.
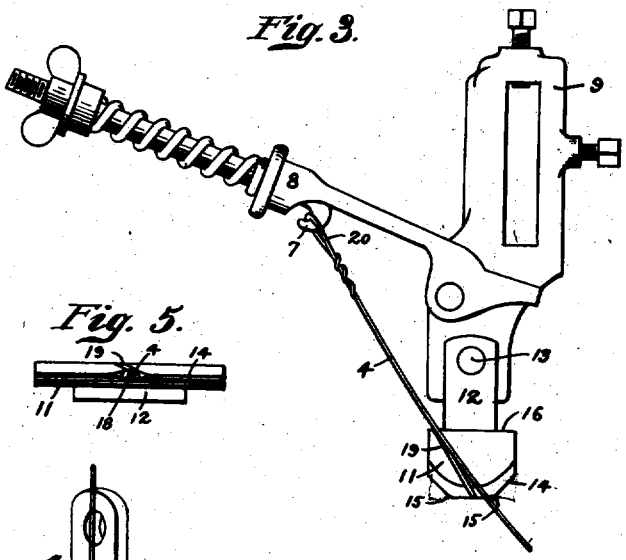
Fig. 5.
Fig. 4
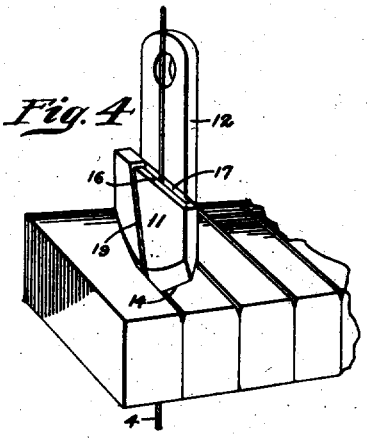
WITNESSES:
W. H. Stough
Elsie F. Mallory.
INVENTOR
William Frey,
BY
Harry Grease.
ATTORNEY

UNITED STATES PATENT OFFICE.

WILLIAM FREY, OF CANTON, OHIO.

BRICK-EDGE-SMOOTHING BLADE.

SPECIFICATION forming part of Reissued Letters Patent No. 12,101, dated March 17, 1903.

Original No. 705,064, dated July 22, 1902. Application for reissue filed October 23, 1902. Serial No. 128,505.

*To all whom it may concern:*

Be it known that I, WILLIAM FREY, a citizen of the United States, residing at Canton, in the county of Stark and State of Ohio, have invented a new and useful Brick-Edge-Smoothing Blade, of which the following is a specification.

My invention relates to a device for use with the wire of a brick-machine cut-off table, the object of which is to make a smooth edge of the face of a wire-cut brick. I attain this object by the mechanism illustrated in the accompanying drawings, in which—

Figure 1 is a perspective view of a part of a brick-machine and a cut-off table; Fig. 2, a detached perspective view of the wire-attaching frame and bracket, showing the smoothing-blade; Fig. 3, a side elevation of the same, showing the manner of inserting the wire; Fig. 4, a detached perspective view of the smoothing-blade as it operates, and Fig. 5 an under edge view of the blade.

Similar numerals refer to similar parts throughout the drawings.

In the manufacture of brick by the stiff-mud process the clay column 1 as it emerges from the die 2 of the brick-machine 3 is cut across by wires, as 4, at suitable intervals for forming the brick. The wires are usually attached in a cut-off frame, as 5, to a bar 6 below and to a tension-hook 7 above. The tension-hook usually has a spring attachment in an arm 8, which is pivotally attached to a bracket 9, which in turn is connected with the cut-off frame. These parts or similar ones are well known in connection with brick machinery and have no relation to my present invention, except as hereinafter mentioned. In cutting through the clay column the wires leave rough and ragged edges on the brick, which are somewhat smoothed on the bottom and sides of the column by rubbing against the cut-off table 10; but the roughness on that face of the brick corresponding with the upper side of the clay column has heretofore been allowed to remain, and as this side of the brick usually becomes the face side when they are laid in a wall the roughness is very objectionable. I overcome this difficulty by using a cutting or smoothing blade 11, which acts around the wire and along the upper surface of the clay column and makes a smooth and partially-beveled edge while the wire makes the cut. The smoothing-blade depends by its shank 12 from the bracket 9, to which it is attached, preferably, by the pivot 13. The lower part of the blade is beveled on both sides, so as to form the cutting edge 14 along the longitudinal middle line. The cutting edge is inclined or curved upward at each end of the blade, preferably in such a manner as to form the acute bends 15 on either side of the cross middle line. Through the body of the blade from the upper edge 16 to the cutting edge is the slot 17, which is preferably elongated at the top and converges to the small and substantially round aperture 18 at the middle of the cutting edge. The aperture 18 is only large enough to neatly receive the wire 4, which is passed through the slot 17. The elongation of the upper part of the slot permits the blade to go and come by swinging on its pivotal point with the bending of the wire when cutting one way or the other, while the small aperture 18 keeps the wire in the middle of the cutting edge at all times. In one side of the blade and entering along one edge of the slot 17 is cut the slit 19, through which the wire is passed into the slot, as shown in Fig. 3. The slit 19 being cut from the aperture 18 diagonally across the side of the blade and the wire being normally along the middle line thereof, as shown in Fig. 4, the wire cannot escape from the slot through the slit in the ordinary operation of the machine. As cutting-wires frequently break, it is very important to replace them quickly, and for this purpose extra wires are usually kept on hand cut to the proper length and having the eyes 20 twisted on the ends ready for immediate use. The twist for these eyes prevents the wires from being inserted endwise through the slot, and so the insertion is greatly facilitated by the slit 19.

The blade can of course be attached directly to the cut-off frame 5 instead of to the intermediate bracket 9 without affecting its operation, and it can also have a rigid attachment instead of by the pivot 13, in which event the upper part of the slot would not need to be elongated for accommodating the bending of the wire, for the blade would prevent such bending; but nevertheless it would be desirable to retain the elongated slot and the diagonal slit for facilitating the insertion of the wire.

The blade is so adjusted with reference to the clay column that it will cut a short distance into the upper side, as shown in Fig. 4, thereby slightly beveling and smoothing the edges of the clay on either side while the wire is making the cut below. The blade being symmetrical in its length, its operation is just the same in either direction.

What I claim as my invention, and desire to secure by Letters Patent, is—

1. In a brick-cut-off table, a cut-off frame, a wire attached in said frame, a blade attached to said frame, and a slot in said blade through which said wire is passed.

2. In a brick-cut-off table, a cut-off frame, a wire attached in said frame, a blade pivotally connected with said frame, and a slot in said blade through which said wire is passed.

3. In a brick-cut-off table, a cut-off frame, a wire attached in said frame, a blade pivotally connected with said frame, and a slot in said blade through which said wire is passed, said slot being longitudinally elongated in its upper part.

4. In a brick-cut-off table, a cut-off frame, a wire attached in said frame, a blade attached to said frame, a slot in said blade through which said wire is passed, and a diagonal slit in the side of the blade opening into said slot.

5. In a brick-cut-off table, a cut-off frame and a blade thereon having an inclined cutting edge with beveled sides, the blade being adapted to cut a short distance into the clay column and to smooth the edges of the cut.

6. In a brick-cut-off table, a cut-off frame and a blade thereon having a longitudinal cutting edge with beveled sides, the blade being adapted to cut a short distance into the clay column and to smooth the edges of the cut.

7. A brick-edge-smoothing blade having a cutting edge on one side, said cutting edge being curved at each end, and a slot in said blade from the cutting edge to the opposite side.

8. A brick-edge-smoothing blade having a cutting edge on one side, said edge being curved at each end to form acute bends on either side of the median line, and a slot in said blade from the middle of the cutting edge to the opposite side.

9. A brick-edge-smoothing blade having a cutting edge on one side, said edge being curved at each end, and a slot in said blade, said slot extending from a substantially round aperture in the cutting edge to an elongated opening in the opposite side.

10. A brick-edge-smoothing blade having a cutting edge on one side, said edge being curved at each end, a slot in said blade from the cutting edge to the opposite side, and a diagonal slit in one side of the blade opening into said slot.

11. A brick-edge-smoothing blade having a cutting edge on one side, and a slot in said blade from the cutting edge to the opposite side.

12. A brick-edge-smoothing blade having a cutting edge on one side, and a slot in said blade extending from a substantially round aperture in the cutting edge to an elongated opening in the opposite side.

13. A brick-edge-smoothing blade having a cutting edge on one side, a slot in said blade from the cutting edge to the opposite side, and a diagonal slit in one side of the blade opening into said slot.

14. A brick-edge-smoothing blade having a cutting edge on one side, a slot in said blade from the cutting edge to the opposite side, and a slit in one side of the blade opening into said slot.

15. In a brick-edge-smoothing blade, a slot in said blade from its edge to the opposite side.

16. In a brick-edge-smoothing blade, a slot in said blade extending from a substantially round aperture in its edge to an elongated opening in the opposite side.

17. In a brick-edge-smoothing blade, a slot in said blade from its edge to the opposite side and a diagonal slit in one side of the blade opening into said slot.

18. In a brick-edge-smoothing blade, a slot in said blade from its edge to the opposite side, and a slit in one side of the blade opening into said slot.

In testimony whereof I have signed my name to this specification in the presence of two subscribing witnesses.

WILLIAM FREY.

Witnesses:

ELSIE F. MALLORY,
HARRY FREASE.